(12) United States Patent
Street (10) Patent No.: US 6,876,495 B2
(45) Date of Patent: Apr. 5, 2005

(54) STRUCTURED LIGHT SOURCE

(76) Inventor: Graham Stewart Brandon Street, Impstone House, Pamber Road, Silchester, Reading, Berkshire RG7 2NU (GB)

( * ) Notice: Subject to any disclaimer, the term of this patent is extended or adjusted under 35 U.S.C. 154(b) by 0 days.

(21) Appl. No.: 10/339,574

(22) Filed: Jan. 10, 2003

(65) Prior Publication Data

US 2003/0107805 A1 Jun. 12, 2003

Related U.S. Application Data

(63) Continuation-in-part of application No. PCT/GB01/03104, filed on Jul. 10, 2001.

(30) Foreign Application Priority Data

Jul. 12, 2000 (GB) .............................................. 0017008

(51) Int. Cl.[7] ........................ G02B 27/10; G02B 27/26; G02F 1/1335
(52) U.S. Cl. .......................... 359/622; 359/465; 349/15
(58) Field of Search ............................... 359/620–624, 359/838, 303, 466, 501, 465; 349/15.16

(56) References Cited

U.S. PATENT DOCUMENTS

| 5,264,964 A | | 11/1993 | Faris |
| 5,537,256 A | * | 7/1996 | Fergason .................... 359/303 |
| 5,629,797 A | * | 5/1997 | Ridgway .................... 359/466 |
| 5,822,117 A | * | 10/1998 | Kleinberger et al. ........ 359/465 |
| 5,875,055 A | | 2/1999 | Morishima et al. |
| 5,936,774 A | | 8/1999 | Street |
| 6,215,594 B1 | * | 4/2001 | Inoguchi et al. ............ 359/619 |
| 6,611,243 B1 | * | 8/2003 | Moseley et al. ............ 349/112 |

FOREIGN PATENT DOCUMENTS

| EP | 0 788 008 A1 | 8/1997 |
| EP | 0 829 744 A2 | 3/1998 |
| EP | 0 833 183 A1 | 4/1998 |
| WO | WO 97/22033 A1 | 6/1997 |
| WO | WO 97/26577 A1 | 7/1997 |
| WO | WO 00/41026 A1 | 7/2000 |

\* cited by examiner

*Primary Examiner*—Georgia Epps
*Assistant Examiner*—Alicia M. Harrington
(74) *Attorney, Agent, or Firm*—Birch, Stewart, Kolasch & Birch, LLP (57) ABSTRACT

Apparatus and method for the display of autostereoscopic images, in which two or more perspective views are generated by a single transmissive display screen is provided. A structured light source behind the screen directs light through different sets of display elements to correspondingly different viewing zones. The structured light source includes two crossed arrays of cylindrical convergent optical elements, two linear arrays of polarisation altering elements which, in conjunction with the convergent arrays and the first polariser of the LCD, prevent light from passing through a particular set of display elements and reaching the wrong viewing zone. In some variations, one or both of the polarisation altering arrays may be programmed. Observer co-ordinate data permits the correct viewing zone to be co-located with each of the observer's corresponding eyes and includes devices for accommodating changes in the observer's distance from the display. The displayed image adapts to the observer's location. All or part of the display may provide conventional two-dimensional images at the screen's full resolution.

45 Claims, 5 Drawing Sheets

STRUCTURED LIGHT SOURCE

This application is a Continuation-In-Part of PCT International Application No. PCT/GB01/03104 filed on Jul. 10, 2001, which was published in English and which designated the United States and on which priority is claimed under 35 U.S.C. § 120, the entire contents of which are hereby incorporated by reference.

BACKGROUND OF INVENTION

1. Field of the Invention

This invention relates to the field of structured light and specifically to the provision of a structured light source for use in providing stereoscopic images which require no special eye wear to be worn by the observer. Such images are usually described as autostereoscopic.

2. Description of Related Art

In U.S. Pat. No. 5,936,774 (Street), which is incorporated by reference herein, a single LCD screen provides both images for an autostereoscopic image pair. This is made possible by a structured light source. The light source is structured by the incorporation of two lenticular screens, each with its cylindrical lens elements running substantially orthogonal to those of the other, in combination with a single, patterned, typically chequered, mask and a standard back light. This arrangement causes at least a particular spectral range of the light from alternate rows of elements within the array of picture elements comprising the LCD image to reach substantially only one eye of the observer and the equivalent light from the other lines of picture elements to reach substantially only the observer's other eye. Such an arrangement is intrinsically inefficient in preserving the light from the back light when the patterned mask is a blocking array, and/or is separated from the back light for structural reasons (for example due to the motion requirement for observer tracking).

SUMMARY OF THE INVENTION

It is an object of the current invention to provide a highly efficient back light as part of a structured light source for viewing an autostereoscopic image using a single LCD screen.

It is a further object of the invention to provide a compact illumination system together with a potentially large image area.

It is another object of the invention to provide for changes in the observer's viewing distance from the display, as well as for changes in lateral position, without affecting the vertical registration of the structured light source, with respect to the rows of the LCD.

It is also an object of the invention to provide a mode in which the LCD screen operates as a conventional two-dimensional display, without loss of the LCD's intrinsic resolution.

Thus, according to the present invention there is provided apparatus for the display of an autostereoscopic image having at least two perspective views of a scene comprising a source of light; a spatial light modulator (SLM) having a plurality of light modulating elements in a plane, intermediate an observer and the source of light; and means for structuring the light so that a first perspective view of the scene is seen by one eye of the observer and a second perspective view of the scene is seen by the other eye of the observer, characterised in that said light structuring means comprises a light concentrating arrangement having a first linear array of light modifying regions and a second linear array of light modifying regions, said first array being spaced from said second array and having its light modifying regions substantially arranged in a first direction and said second array having its light modifying regions substantially arranged in a second direction, said first direction being orthogonal to said second direction, so that, in use and in conjunction with a polarising element intermediate said arrays and said light modulating elements, said light structuring means forms, for each view of the image, a set of vertically spaced concentrations of light substantially mapped onto a respective set of said elements of the SLM.

It is understood that the term "vertical" herein is used with reference to an observer whose eyes are horizontally spaced.

According to a further aspect of the invention, the first linear array of light modifying regions comprises a first set of polarising regions which cause the light emitted therefrom to be polarised in a first direction of polarisation and a second set of polarising regions which cause the light emitted therefrom to be polarised in a second direction of polarisation, in which the first direction of polarisation is orthogonal to said second direction of polarisation. Advantageously, the first set of polarising regions and the second set of polarising regions are interdigitated, so that odd ones of the first array comprise said first set of polarising regions and even ones of said array comprise said second set of polarising regions. Each light modifying region is elongated, substantially in a horizontal direction, and is associated with at least one corresponding vertically convergent element within a first array of convergent elements, said first array of convergent elements being positioned intermediate the SLM and the first linear array so that light from a point at the plane of the light modifying regions is substantially re-imaged in a vertical plane onto the plane of the light modulating elements of the SLM by said at least one vertically convergent element.

According to this invention clockwise circularly polarised light is orthogonally polarised to counter-clockwise circularly polarised light.

Regions of the first array of light modifying elements may polarise light of selected portions of the spectral range in the first direction and other portions of the spectral range in the second direction.

According to a further aspect of the invention, the vertical spacing Vs between corresponding edges of adjacent regions within the first linear array and the vertical width Vw of said regions are related by the inequality $Vs/2 \leq Vw \leq Vs$. Preferably the first linear array comprises a reflective surface in which the regions of said first array comprise apertures and/or light transmitting regions having a vertical width Vw.

According to another aspect of the invention, the second linear array of light modifying regions comprises a set of polarisation rotating regions which cause the plane of polarisation of light, incident thereon and following passage therethrough, to be turned through 90°. In use, said rotating regions are spaced by regions which leave the polarisation of incident light substantially unaltered. Each polarisation rotating region is elongate, substantially in the vertical direction, and has a corresponding vertically elongate horizontally convergent element within an associated second array of convergent elements, said second convergent array being positioned intermediate the SLM and the second linear array so that light from a point within said polarisation rotating region is substantially collimated by said horizontally convergent element in a horizontal plane.

In certain embodiments of the invention the polarisation rotating elements are tapered, with a taper corresponding to that of the vertically elongate horizontally convergent elements.

Advantageously the observer's location is tracked by controlling the direction in a horizontal plane of the light from the light structuring means in response to said observer's coordinate data.

In one embodiment of the invention this is accomplished by moving the second linear array relative to the vertically elongate horizontally convergent elements. The observer's distance from the light structuring means is tracked by relative motion between the second linear array and the vertically elongate horizontally convergent elements along a vertical axis which is substantially aligned with the elongate direction of the horizontally convergent elements. The observer's lateral position with respect to the light structuring means is tracked by relative motion of the second linear array and the vertically elongate horizontally convergent elements in a horizontal plane and a direction orthogonal to a vertical axis which is substantially aligned with the elongate direction of the horizontally convergent elements.

In another embodiment of the invention, each polarisation rotating region is comprised of a plurality of juxtaposed independently programmable elements, selected to be polarisation rotating by control means in response to the location of the observer. The observer's distance from the light structuring means is tracked by said control means, substantially by setting the period of repetition of the pattern of polarisation rotating regions. The observer's lateral position relative to the centre line of the light structuring means is tracked by said control means substantially by positioning a nominal boundary of a polarisation rotating region at a distance corresponding thereto. Under certain conditions, an additional observer may be tracked by the control means by the positioning of an additional nominal boundary of a polarisation rotating region to correspond to the position of said additional observer.

Typically, the nominal boundary of a polarisation rotating region is located within a programmable element and said element is programmed to adopt a state intermediate that of a polarisation rotating region and a region adjacent thereto which leaves the polarisation of light transmitted thereby unaltered.

Advantageously, the intermediate state is achieved by temporal dithering, so that the proportion of time in which said element is programmed to rotate the polarisation of light transmitted thereby corresponds to the proportion of said element which is located intermediate the nominal boundary and an adjacent element which is programmed to be polarisation rotating.

According to a further aspect of the invention, at least one of the first and second light modifying linear arrays is programmable, so that, in use, regions providing light polarised in the first direction of polarisation become regions which provide light polarised in the second direction of polarisation and vice versa. In use, the programmed switching of one of the linear arrays permits the SLM to provide a two-dimensional image to its full resolution.

In preferred embodiments the SLM is a liquid crystal display.

Advantageously each array of convergent optical elements comprises a lenticular screen.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
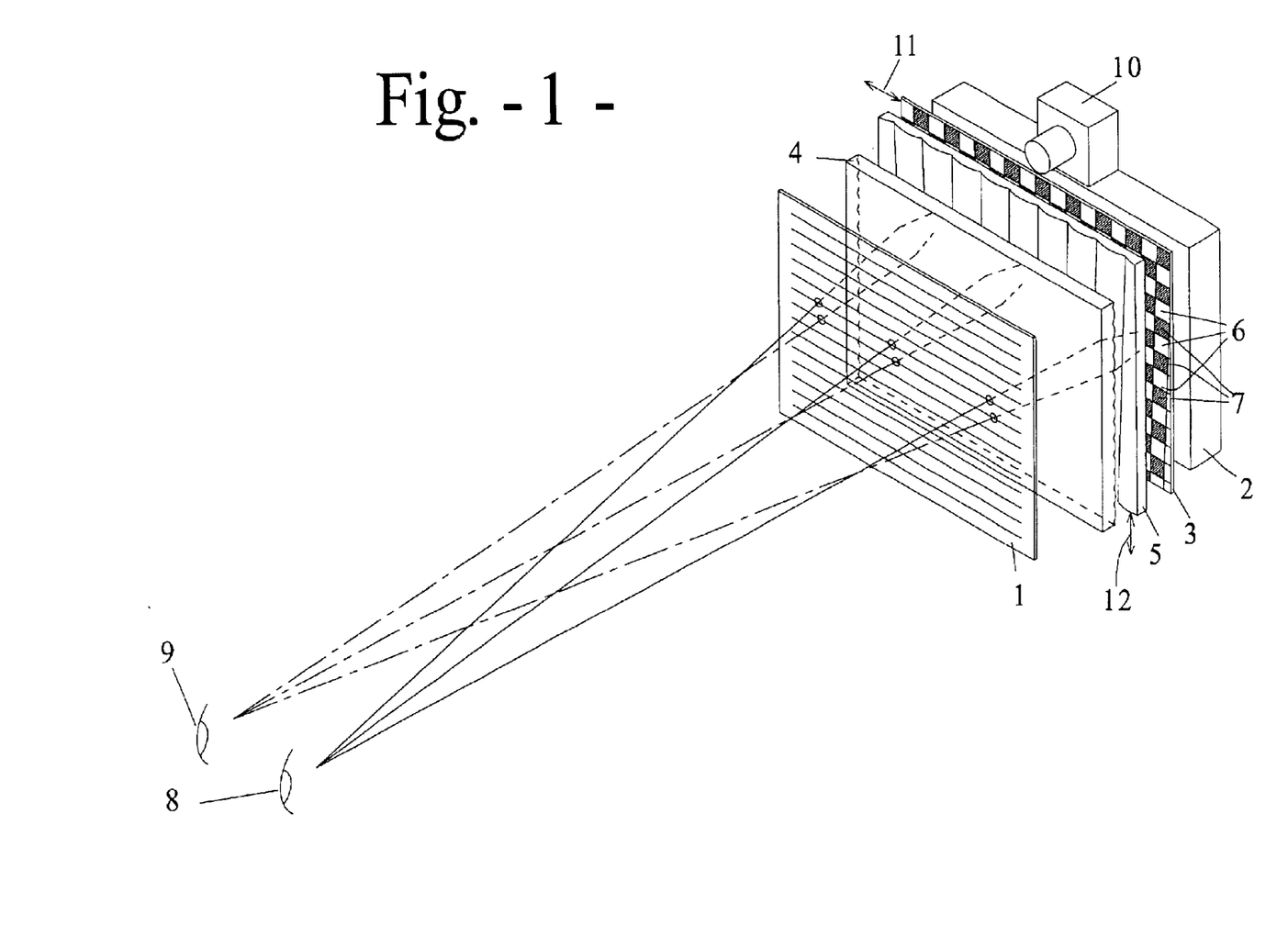
FIG. 1 shows, diagrammatically, a structured light source constructed in accordance with the prior art.

In FIG. 1, as disclosed in U.S. Pat. No. 5,936,774 (Street), an LCD 1 is positioned in front of a back light, in the form of a light box 2. The structuring of the light from box 2, before it reaches LCD 1, is achieved by a light concentration process utilising the combination of a vertically convergent array of lens elements 4 and a horizontally convergent array of lens elements 5, positioned in front of a chequered mask 3. Points at the plane of mask 3 are substantially imaged onto the plane of LCD 1, in a vertical plane, by array 4, and substantially collimated (slightly converging) in the horizontal plane, towards two viewing zones co-located with the horizontally spaced eyes 8 and 9 of the observer, by array 5. An infrared camera 10 is used to determine the location of the observer, so that the viewing zones can be made to track the latter's position. This is achieved by the motion of the horizontally convergent array 5 relative to the chequered mask 3. Vertical motion 12 of array 5, which has a tapered structure, ensures that changes in the viewer's distance are accommodated, whereas horizontal motion of the viewer is tracked by horizontal motion of chequered mask 3.

The configuration of FIG. 1, whilst effective, can be replaced by a different combination of elements, with certain additional advantages.

Figure 2A:
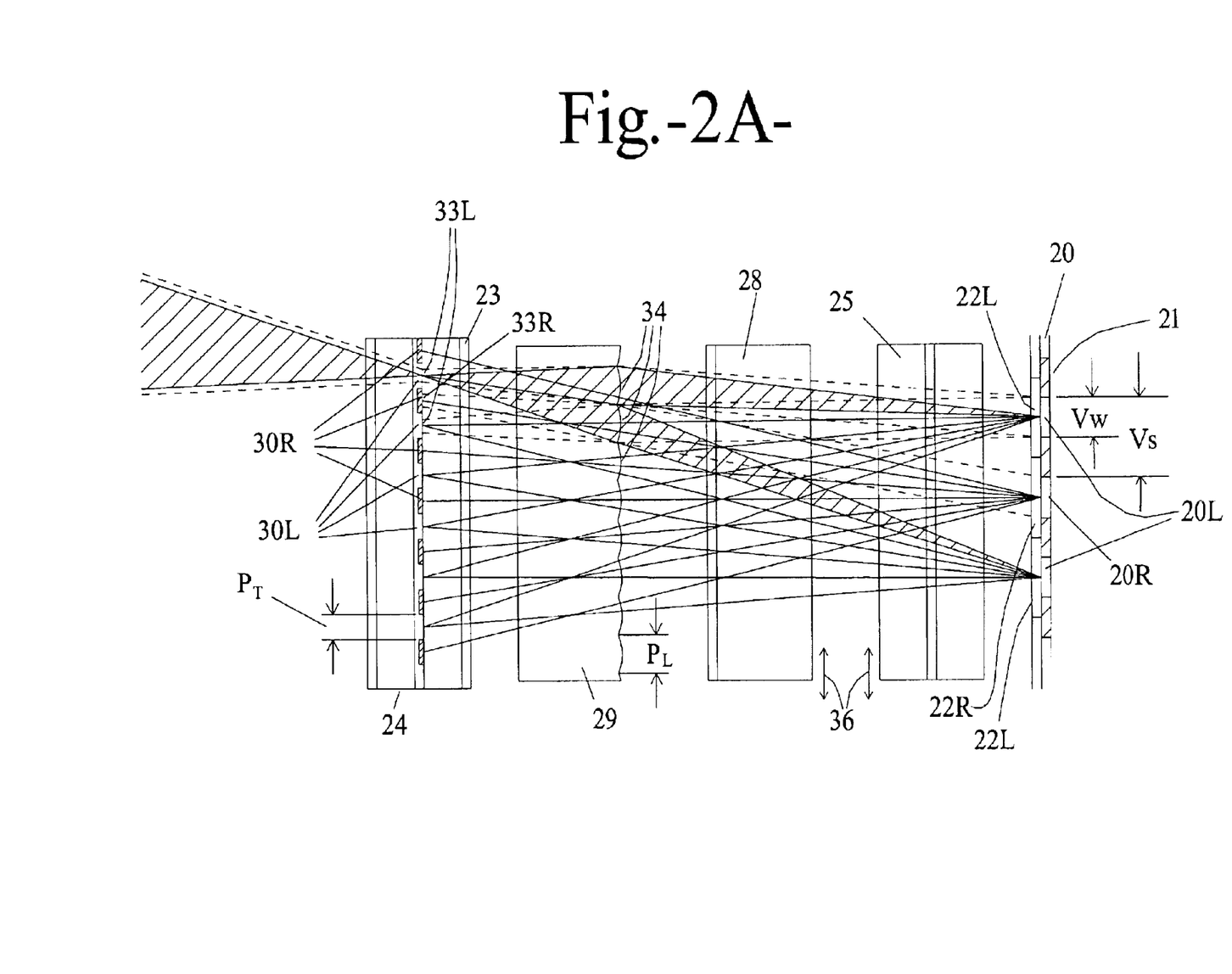
FIG. 2A shows, in vertical section, a structured light source constructed in accordance with the current invention.
Figure 2B:
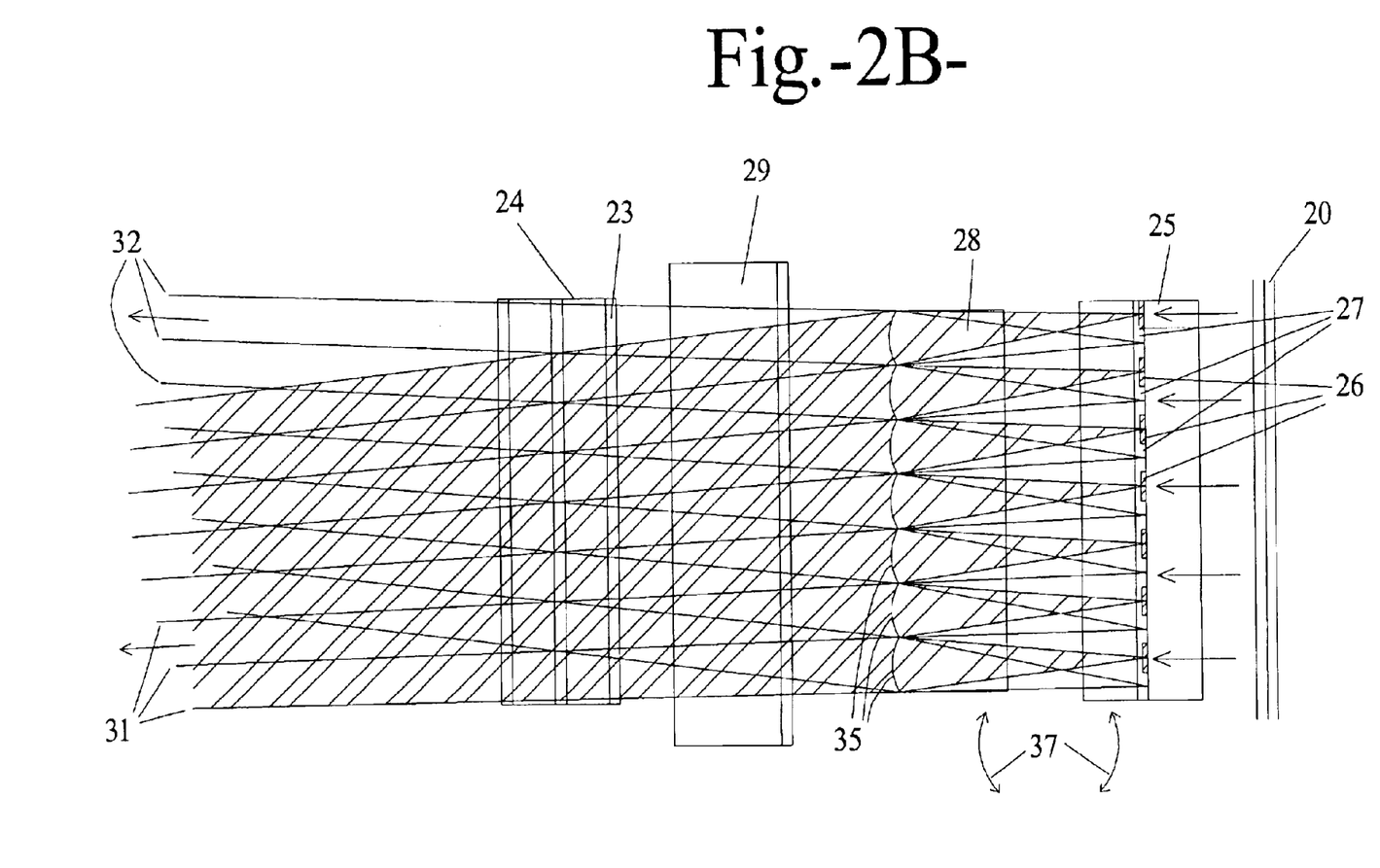
FIG. 2B shows, in horizontal section, the structured light source of FIG. 2A

In FIG. 2A, the new arrangement is shown in vertical section and, in FIG. 2B, in horizontal section.

In the current invention, the single patterned mask is replaced by two spaced and crossed structures. The first comprises an array of vertically spaced horizontally extending apertures. The light passed by alternate apertures is polarised orthogonally to that passed by the interleaved ones. The second structure is a horizontally spaced array of substantially vertically extending regions, each of which rotates the plane of polarisation of the light which it passes by 90°. What is observed from one side, when such a combination is illuminated from the other, is a light source having a polarisation structure suitable for illuminating an LCD to provide autostereoscopic images. One of the advantages of this arrangement over the prior art is that light which is not passed by the first array may be conveniently thrown back into the back light (light box). The first array is conveniently formed on the front window of this light box.

More specifically, the function of the chequered mask 3 of FIG. 1 is performed by the combination of three components. Turning to FIG. 2A, the first of these comprises a first linear array 20 of light modifying elements comprising vertically spaced horizontal slit-like apertures or light transmitting regions 20L and 20R in a mirrored surface 21. Each element further comprises one of a series of polarising elements 22L and 22R each in front of a corresponding one of apertures 20L and 20R, thus ensuring that the light emanating from alternate apertures is polarised orthogonally to that from its nearest neighbours. Typically, one of these polarisation directions is aligned with that of the input polariser 23 of a spatial light modulator (SLM), in the form of a liquid crystal display (LCD) 24.

It is found advantageous to leave mirrored portions of surface 21 between the light transmitting slits themselves, with the mirrored portions having a vertical width up to that of the transmitting slits. Put another way, the vertical width $V_W$ of slits 20L and 20R is preferably greater than or equal to half the pitch $V_S$ between corresponding edges of adjacent slits.

Figure 4:
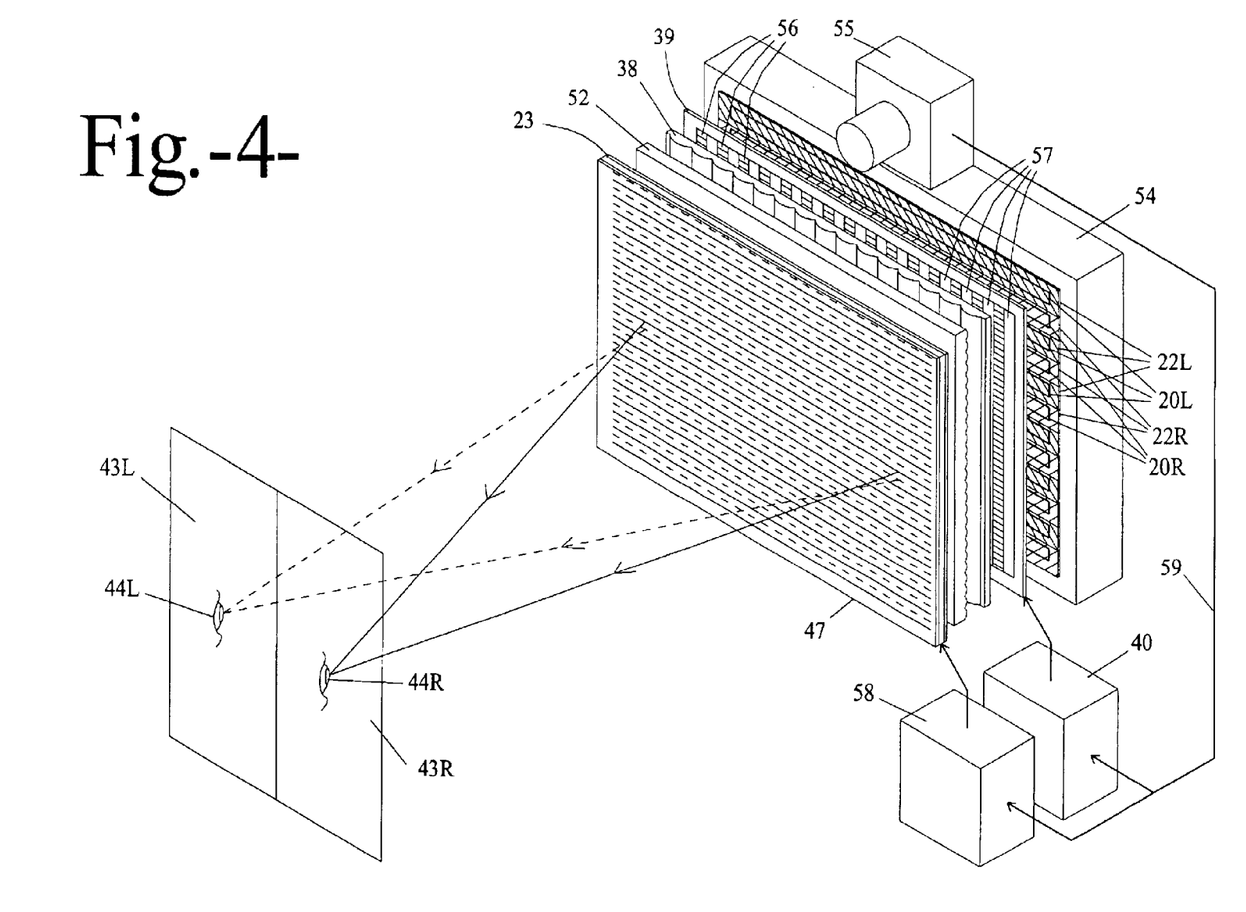
FIG. 4 is an isometric view, in diagrammatic form and not drawn to scale, which comprises the apparatus of FIG. 3.

If the mirrored surface is highly efficient and is incorporated within the front of a light box of the type shown in FIG. 4 and labelled 54, then the light which it reflects back is redistributed within the light box and a proportion will eventually find its way out of one of the slits, making the arrangement very light efficient.

The second component, which works in conjunction with the array of alternately polarised slits 20L and 20R to provide a function similar to that of a chequered mask, comprises a horizontally spaced array of polarisation rotating regions, in the form of a special purpose segmented liquid crystal panel 25, best illustrated with reference to FIG. 2B. This comprises regions 26, which rotate the incoming plane of polarisation through 90°, interleaved on a 50:50 mark to space ratio with regions 27, which leave this unaltered. Both types of region are typically tapered, to match the taper of a horizontally convergent lenticular array 28 in accordance with the principles which apply to the columns of the mask of FIG. 1, and each extends substantially vertically. The width of each lens of array 28 is closely matched to the combined width of one region 26 and an adjacent region 27 within panel 25. The taper allows small adjustments in local scale to accommodate changes in the observer's distance from the apparatus.

As seen from any point at the central plane of LCD 24 through its polariser 23, and without the actions of convergent lenticular array 28 and another vertically convergent array 29, the combined action of array 20 of horizontal alternate orthogonally polarised slits, together with panel 25, provides a chequered array or pattern, with bright regions where the final polarisation of the light is aligned with the direction of polariser 23 and dark regions where these are crossed. In effect, polariser 23 comprises the third component required to provide the function of the light blocking chequered mask 3, of FIG. 1. The pattern is distinguished from the prior art in that each bright region has horizontal boundaries, defined at the plane of apertures 20R or 20L, whereas vertical boundaries are defined at the plane of panel 25. The convergent array 29, which comprises a set of vertically convergent horizontally extending lens elements 34, is positioned and has a focal length so that points at the plane of array 20 are re-imaged in a vertical plane to points at the central plane of LCD 24.

By arranging for the pitch between the slit apertures in array 20 to be related to the pitch between adjacent lens elements 34 of array 29 and the vertical pitch between adjacent rows of light modulating elements (pixels) of LCD 24, in a manner equivalent to that disclosed in U.S. Pat. No. 5,936,774, alternate slits 20L and 20R will illuminate respectively alternate rows 30L and 30R of LCD 24. It may be shown that the vertical pitch VS of adjacent slit apertures 20L and 20R, the vertical pitch PT of adjacent rows of LCD 24 and the vertical pitch $P_L$ of adjacent lens elements 34 of lenticular screen 29 should, to a good approximation, obey the following relationship:

$V_S = (P_T \times P_L)/(N \times P_T - P_L)$, where N is an integer.

The focal length of the convergent elements follows from the spacing between the three components of the system and ensures that the array of slit apertures is correctly imaged to the central plane of the LCD.

The tapered convergent elements 35 of array 28 have a focal length and are positioned with respect to the plane of polarisation rotating regions 26, so that light 31 from points within regions 26 is generally collimated towards the right eye of the observer. Likewise, light 32 from points within intermediate regions 27 is generally collimated towards the observer's left eye.

Reverting to FIG. 2A, it will be understood by those versed in the art that, because slits 20L and 20R, through corresponding polarisers 22L and 22R, provide orthogonally polarised light, the light pattern impinging on rows 30L is complementary to that impinging on rows 30R. Typically, in the illustrated embodiment, the light from slits 20L impinges on LCD rows 30L, ultimately, to provide image content to the observer's left eye. Conversely, the light from slits 20R impinges on LCD rows 30R, and provides image content to the observer's right eye. By ensuring that $V_W < V_S$, a typical value would be $0.75 \times V_S$ with a value as low as $0.5 \times V_S$ being quite practical, the limitations imposed by the field curvature and aberrations of the lens elements 34 of array 29 are accommodated, without light from one of slits 20L encroaching on an incorrect pixel row 30R of LCD 24. The vertical spacing Vs of the elements within the first linear array and the vertical width Vw of these elements are related by the inequality, $Vs/2 \leq Vw \leq Vs$ The effect of this arrangement is to form, for each of the right and left eye, a set of vertically spaced concentrations 33L and 33R of light substantially mapped onto a respective set of elements of LCD 24, enabling the left and right eye views to be displayed, simultaneously, on alternate pixel rows thereof.

In the embodiment of FIG. 2, two arrays of orthogonally orientated polarisers 22L and 22R are configured in an interdigitated manner in front of their corresponding slit-like apertures 20L and 20R. It will be clear that it is equally effective to replace these elements with a single input polarising sheet and a further liquid crystal panel, with vertically spaced regions extending horizontally. By applying rotation, as required, to the polarisation of the light emanating from alternate slits, the same result is achieved and a first linear array of light modifying regions is, thereby, provided, in accordance with this invention. It is sometimes convenient to provide circular polarised light from the spaced apertures 20L and 20R. These would, typically, be alternately clockwise and anti-clockwise and the two states are, effectively, orthogonally polarised. By passing the light through a suitably orientated quarter-wave retardation plate, positioned intermediate the apertures and the input polariser of the image forming LCD, the two orthogonal linear polarisation states are obtained.

In other embodiments of this invention, colour selective polarisers may be used, so that the light from any given horizontal slit is polarised in one direction for a portion of the visible spectrum, or a first spectral component, and in the orthogonal direction for a second complementary spectral component. When this configuration is adopted, the light from slits 20L, which impinges on LCD rows 30L, serves to provide image content to the observer's left eye for the first spectral component and image content to the observer's right eye for the second spectral component. Conversely, the light from slits 20R impinges on LCD rows 30R to provide image content to the observer's right eye for the first spectral component and image content to the observer's left eye for the second spectral component.

The current invention offers specific advantages, when compared to the prior art, in relation to component alignment and observer tracking. It will be clear to those versed in the art that the motion of the viewing zones required to co-locate these with the eyes of the observer (8 and 9 in FIG. 1), is effected by the relative motion of the two tapered structures in the embodiment of FIG. 2, namely the tapered lenticular screen 28 and the liquid crystal panel 25 having tapered regions 26 and 27. Tracking of the observer's distance from the displayed image is effected by relative motion between panel 25 and screen 28 along a vertical axis 36, substantially aligned with the cylindrical axes of the screen's individual lens elements. The observer's lateral position is tracked by relative motion of panel 25 with respect to screen 28 in a direction 37 orthogonal to the aforementioned vertical axis. Ideally this motion accommodates both the field curvature of the elements of screen 28 and the taper between them, maintaining correct alignment of screen to panel. The alignment of the structured light with respect to the LCD 24 depends on the precise positioning and alignment of the array of slit-like apertures 20 relative to both LCD 24 and lenticular array 29. Once aligned, these require no movement. The current invention separates two important alignment requirements, whereas the prior art, which employs a single chequered mask requires four components to be aligned in a single operation.

In the embodiments of the invention described thus far with reference to FIGS. 2A and 2B the tracking of the observer is accomplished by mechanical movement of the second linear array, in the form of liquid crystal panel 25, which preferably has tapered vertically elongate regions 26 and 27, relative to the corresponding tapered lenticular screen 28. Two degrees of freedom 36 and 37 ensure that the observer's distance from the assembly, as well as lateral position relative thereto, can be accommodated.

Figure 3:
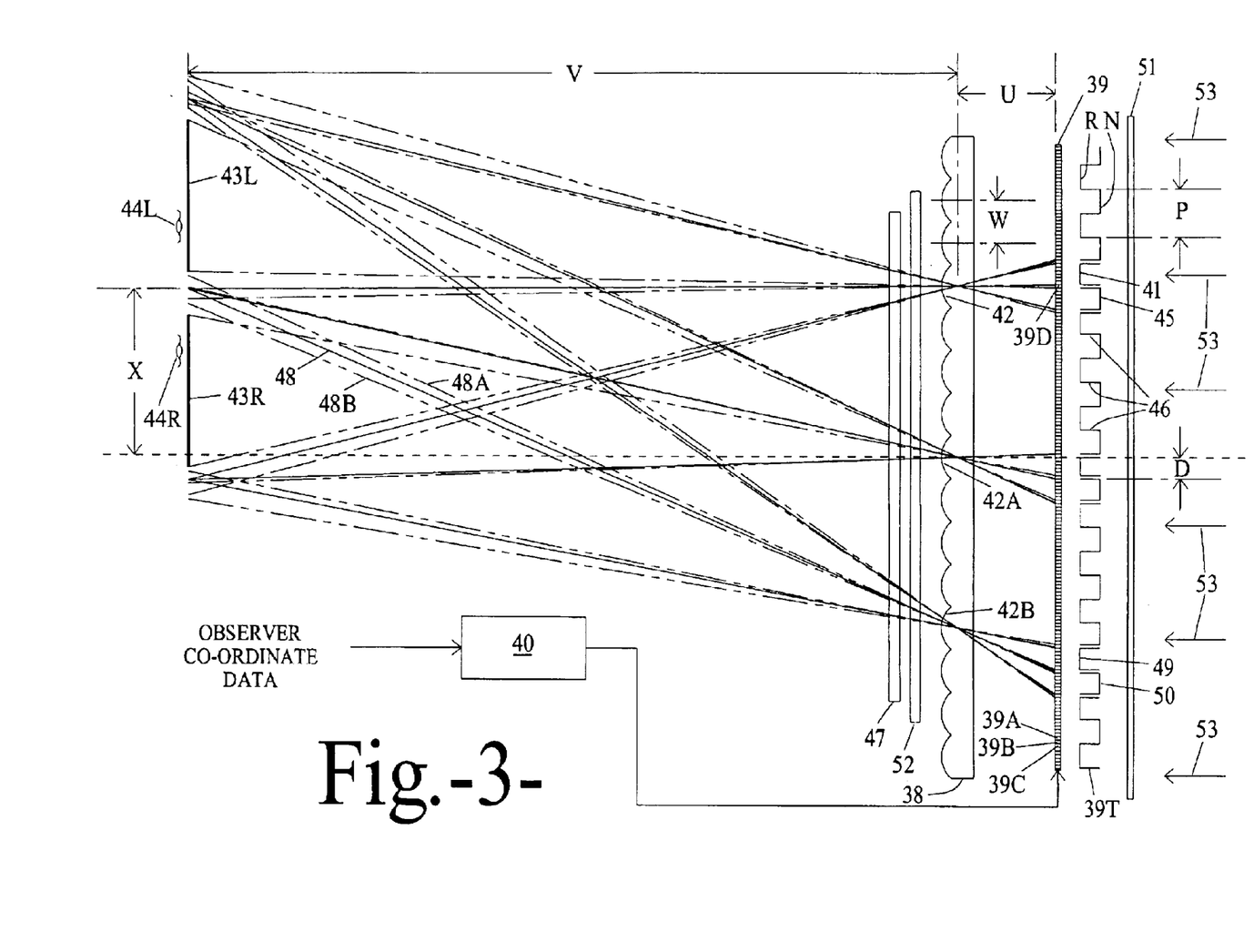
FIG. 3 shows, diagrammatically, an embodiment of the invention in which, observer tracking for both lateral and longitudinal position is achieved by suitable programming of one of its components.

FIG. 3 illustrates an embodiment of the invention which achieves this, without mechanical motion, and does not require the horizontally convergent lenticular elements of lenticular screen 38 to have a tapered structure. A simple liquid crystal panel 39 comprises a large number of horizontally narrow, juxtaposed and vertically elongate elements 39A, 39B, 39C etc. Each element can be switched between two states. In one state, the polarisation of light passing through the element is left unaltered. In the other state the polarisation is rotated through 90°. The elements are programmed by a controller 40 in groups, each of which comprises a band or region of greater width than that of a single element. As in the embodiment of this invention already described, each region either rotates the polarisation of the incident light (State R) or leaves this unaltered (State N). In FIG. 3, these two states are indicated by trace 39T, as a function of position along panel 39.

Controller 40 receives its input from an infrared camera or similar device (not shown) arranged to locate the observer in accordance with known principles and this information is used to define the widths and positions of the bands. Each band in State R, such as band 41, is magnified by a corresponding lenticular lens, such as lens 42, to a viewing zone 43R, at which is located the observer's right eye 44R. A second viewing zone 43L, for the observer's left eye 44L, corresponds to bands in State N, such as band 45. Due to the discreet nature of panel 39, it typically has elements, such as element 39D between bands 41 and 45, which straddle the theoretical or nominal boundary, such as 46, between two such regions. This nominal boundary is not shown between bands 41 and 45. Instead, trace 39T indicates the positions of the two real boundaries of element 39D.

The position of the theoretical boundary is determined by simple computational means within control 40. The following formulae apply:

$$D = X \times (U/V) \text{ and}$$

$$P = W \times (U+V)/V,$$

in which X is the lateral displacement of the observer with respect to the centre of the displayed image, U is the distance between the principal plane of the lens elements of screen 38 and the plane of panel 39, V is the distance of the observer from the principal plane of the lenses, W is the width of or pitch between the lens elements of screen 38 and P is the width of one cycle of the pattern of bands or regions (one band in State R and one in State N).

In practice the observer's eyes are not located at positions corresponding to elements which straddle a theoretical boundary and the state of such elements may be left indeterminate. However, in preferred embodiments of this invention, these are arranged to have an intermediate state, by analog or temporal dithering means, so that the appropriate proportion of the light transmitted by that element is attributed to the relevant state of polarisation, when this impinges on the image providing LCD 47. The reason for this is to evenly provide light for each of the right and left eye views from LCD 47, thereby reducing the risk of unwanted artefacts. Provided the edges of each eye's viewing zone are defined to within 25% of the spacing between the observer's eyes, there will be no difficulty in providing well separated left and right eye images at the location of the observer.

The effect of varying the width and locations of the bands, such as 41 and 45, and, thereby, moving the lateral position and adjusting the scale of the overall pattern relative to that of the elements of lenticular screen 38 is similar to that of moving the tapered elongate elements 26 and 27 of FIG. 2B relative to the tapered lens elements 35 of lenticular screen 28.

The embodiment of FIG. 3 provides control of the effective positions of the viewing zones 44L and 44R, respectively for the left and right eyes 44l and 44R of the observer, in a discrete manner. As already described, the positions of the edges of each viewing zone are defined only to the width of a single element of panel 39, following magnification by the corresponding lens element, such as element 42, of lenticular screen 38. In order to illustrate this point further, three groups of rays, such as 48, 48A and 48B, are shown for each boundary of each band associated with each of three lens elements 42, 42A and 42B of screen 38. Specifically, ray 48 is the ray from the theoretical boundary between band 49 in State R and band 50 in State N, whereas rays 48A and 48B are the rays associated with the actual edges of the individual element of panel 39 which straddles that theoretical boundary.

To optimise the tracking capability provided by programming the widths and positions of the bands on panel 39, the intrinsic horizontal resolution of this component is suitably shared, between lateral and longitudinal position control of the viewing zones, by chosing an appropriate lenticular element width for screen 38. For example where panel 39 comprises 800 horizontally juxtaposed elements (fewer are shown in FIG. 3, for diagrammatic convenience and, accordingly, fewer lens elements), this may conveniently be divided so that approximately 16 elements are positioned opposite each lens element of screen 38. In this case the lenticular screen would comprise approximately 50 lens elements. (In FIG. 3, approximately 12 elements of panel 39 are shown opposite each of 15 lens elements of screen 38.). As the observer's distance V from the principal plane of the lenses of screen 38 reduces, the number of elements of panel 39 which contribute to a pair of bands of State R and State N is increased. In other words, as the observer's viewing distance reduces, the width (P/2) of the bands is increased, in accordance with the formulae given above and in a manner similar to the relative scale of the tapered pattern provided by liquid crystal panel 25 in the embodiment of FIGS. 2A and 2B. In that case this is accomplished by vertical mechanical motion 36, relative to the corresponding tapered lenticular screen 28.

As is the case for the embodiment of FIGS. 2A and 2B and the teachings of U.S. Pat. No. 5,936,774, the structured light, provided by the embodiment of FIG. 3, segments LCD 47's image vertically, on a line by line basis, with the aid of two additional components, array 51 and lenticular screen 52, in order to provide different left and right eye images. The input polariser of LCD 47 is not shown separately, as is the case for LCD 24 in FIG. 2A. Array 51 comprises vertically spaced, horizontally extending apertures, alternate ones of which transmit light polarised orthogonally to that transmitted by the other interdigitated apertures. The light 53 is provided by a conventional fluorescent back light (not shown). It should be noted that the width of the elements of screen 38, such as lens element 42, is not dictated by the horizontal resolution of the image to be provided for viewing by the observer on the primary LCD 47. The observer sees, with each eye, all the pixels intended (typically each having a width of a fraction of a millimeter), in front of an element of screen 38, which itself may be several millimeters wide.

FIG. 4 shows an isometric view of the principal components of FIG. 3. Accordingly, like reference numerals, including some from FIGS. 2A and 2B, are used, where appropriate. Also shown is a back light in the form of box 54 which provides the light 53 of FIG. 3. This light source has slit-like horizontal apertures 20L interdigitated with slit-like horizontal apertures 20R, as illustrated in FIG. 2A, which together with respective sets of polarisers 22L and 22R on the outside of box 54 comprise the array 51 of FIG. 3. The polarisers 22L and 22R are shown hatched in orthogonal directions in FIG. 4 in order to identify the difference in their alignment. Array 51 comprises a linear array with its elements arranged along a vertical axis.

An observer tracking camera 55, as provided in U.S. Pat. No. 5,936,774 and shown as item 10 in FIG. 1, is also included and this provides controller 40 with observer co-ordinate data, which is translated into the programming of the pattern of polarisation rotating vertically extending stripes 56 required on panel 39. As illustrated in FIG. 2A, the polarisation imparted to light passing through polarisers 22L is orthogonal to that imparted to light passing through the interleaved set 22R. In this way, the array 51 of FIG. 3 comprises a linear array of light polarisation modifying regions, itself composed of two interleaved sets of polarisation modifying regions, each imparting a different direction of polarisation to all or a defined portion of the light's spectral range. The regions 56 of panel 39, which are programmed to rotate polarisation through 90° form a third and orthogonal set of polarisation modifying regions. These vertically extending regions comprise a second linear array of polarisation modifying regions with its elements spaced along a horizontal axis. Finally, it is the input polariser 23 of LCD 47 which blocks the unwanted light, which could otherwise pass through the modulating elements of the LCD, to reach the wrong eye of the observer.

In the embodiment of FIGS. 2A and 2B, the orthogonal polarisation modifying regions 26 are interleaved with a fourth set of regions 27 which leave the polarisation of the incoming light unaltered. Likewise, in the embodiment of FIG. 3 the regions of panel 39 which are not arranged to rotate the plane of polarisation are in fact assumed to leave this unaltered. This is one possible arrangement which satisfies the requirements of the invention. The requirement, in general, is that light which enters panel 39 with a specific direction of polarisation must be influenced by regions 56 and interleaved regions 57 in a complementary way, so that it leaves the former with a direction of polarisation which is orthogonal to that which it has on leaving the latter. It is then a further requirement that the input polariser 23 of LCD 47 be arranged so that it blocks the light associated with one of these states of polarisation.

As described with reference to FIGS. 2A and 2B, in certain embodiments, polarisers 22L and 22R are arranged to polarise one part of the spectrum (e.g. green light) orthogonally to its complement (e.g. magenta light). Such configurations require the green component of the right eye imagery and the magenta component of the left eye imagery to be displayed on the same row of LCD 47 and vice versa and, thereby, can provide an efficient distribution of picture elements for each of the observer's eyes.

The observer tracking camera 55 provides a controller 40 with observer co-ordinate data, which, in turn, is used to position viewing zones 43L and 43R, which receive light intended for viewing by the left eye 44L and right eye 44R respectively, by programming panel 39 accordingly. The same co-ordinate data may in fact be provided to a graphics processor 58, as would typically be found within a computing environment, via data path 59. Processor 58 uses this data to define the two user position dependent perspective views of a three-dimensional computer model which may then be provided to the observer viewing LCD 47. In this way, as the observer moves relative to the displayed image, this adapts and appears, provided the graphics engine can respond quickly enough, as a natural object would. The observer not only sees a three-dimensional object, but experiences motion parallax as his point of perspective changes.

FIG. 3 illustrates the arrangements required to track a single observer. It will be clear to those versed in the art that, as the width of the lens elements of screen 38, such as 42, 42A and 42B, is increased and their numbers are reduced, the number of elements of panel 39, associated with each such lens element is also increased. Providing there are sufficient such elements and the magnification of this group or region at the viewing location is such that it exceeds the space required by more than one observer, this invention permits the provision of independently tracked observers and State R and State N bands, within the group, corresponding to each one of them.

A further advantage of the current invention arises out of the use of a liquid crystal panel to create interdigitated striped regions of rotation of and unaltered polarisation. By programming or switching the state of the different regions of the liquid crystal panel, using suitably arranged electrodes, the structured light source may be switched so that what would normally be left eye imagery is observed by the right eye and vice versa. The principal advantage of this facility is that by rapid switching in this manner LCD 24 of FIGS. 2A and 2B and LCD 47 of FIG. 3 may be used to their full resolution in a conventional (two-dimensional) manner. This is particularly appropriate when displaying high quality graphics and text. It will also be clear to those versed in the art that, by suitable segmentation of this mode, LCD 24 and LCD 47 may each have segments for 2D use and others for 3D image display.

In addition, a rapidly switched arrangement can provide a three-dimensional image at full resolution, provided high speed switching (for example ferro-electric) elements are employed for both the LCD and the programmed array 39. In this case, when the right eye receives light from the even rows of the LCD, these are arranged to display corresponding imagery. Conversely, when the state of the polarisation rotating and non-rotating elements is reversed, right eye imagery is provided by the odd lines of the LCD. The advantage of the current invention, when used in this manner, compared to normal Field Sequential stereoscopic viewing, where the whole image is switched between left and right eye imagery, is that the amount of light reaching each eye remains substantially constant throughout the viewing process and no undesirable flicker is experienced.

In WO 00/41026 (Street), the relative positioning of two components, a lenticular screen and a patterned screen, such as a barrier screen, in order to provide, inter alia, correctly located viewing zones for the display of a 3D image, is achieved by using optical feedback, in which light from portions of the pattern itself impinges on at least one detector array, such as a CCD, following passage through at least one lens element of the lenticular screen. A similar approach may, if necessary, be adopted for this invention in which portions of the pattern on panel 39 are programmed to provide the required pattern or patterns. Such a pattern would, in the case of this invention where polarisation is altered, be imaged onto a corresponding detector array through a polarised filter, so that an image of the pattern is detected, as required.

Whilst control means 40 is, in the illustrated embodiment of FIG. 3, assumed to be controlled by data received from an observer locating sub-system, this may, in simple embodiments, be provided in whole or in part through direct control by the observer.

It will be clear to those versed in the art that the principles of this invention are not limited in their application to the provision of a structured array of polarised light, for use in a three-dimensional display which is based on an LCD as its primary imaging component. Any other transmissive display, such as a static colour transparency, backed with a suitable polariser and in which the left and right eye image data has been suitably configured, can be viewed stereoscopically without glasses, by back lighting this in accordance with the teachings of this invention.

It will also be apparent that whilst the vertically convergent array 52 and horizontally convergent array 38 of FIG. 4 are shown as two spaced arrays, these may be supported by a single substrate or the required characteristics may be provided by a single two-dimensional array of elements, each having the required vertical and horizontal convergence. Such elements may each comprise a toroidal surface portion. Alternatively, all convergent elements may comprise holographic optical elements or may be formed on their supporting substrate as surface relief structures such as fresnel lens elements.

Another example of an application for a structured light source constructed in accordance with this invention is as an alignment means for creating an array of polarising elements, in which the direction of the polarised light provided by the structured light source and incident upon the array, controls the direction of the polarisation axis of an element within the array, during the alignment process.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. Apparatus for the display of an autostereoscopic image having at least two perspective views of a scene including a source of light; a spatial light modulator, located in use intermediate an observer and the source of light and having a first set and a second set of light modulating elements in a plane for providing image content for viewing respectively by a first eye of the observer and a second eye of the observer; and means for structuring the light, which comprises:

a light concentrating arrangement having convergent optical elements;

a first linear array of light polarisation modifying regions having a first set of polarisation modifying regions which, in use and for at least a first portion of the spectral range thereof, cause the light emitted therefrom to be polarised in a first direction of polarisation and a second set of polarisation modifying regions which, in use, cause said first portion of the spectral range of the light emitted therefrom to be polarised in a second direction of polarisation orthogonal to said first direction of polarisation in which said second set of polarisation modifying regions is interleaved with said first set of polarisation modifying regions, so that odd ones of the first array comprise said first set of polarisation modifying regions and even ones of the first array comprise said second set of polarisation modifying regions, each of said first set and said second set of light polarisation modifying regions having its members spaced substantially along a first axis; and a second linear array of light polarisation modifying regions, being spaced from said first array and including an orthogonal set of light polarisation modifying regions, the regions within said orthogonal set of polarisation modifying regions being spaced substantially along a second axis orthogonal to said first axis;

wherein the second linear array also includes:

a third set of regions interleaved with a fourth set of regions, in which a first one of said third and fourth sets of regions comprises the orthogonal set of polarisation modifying regions; and, for light which has the same incoming direction of polarisation prior to impingement on both of said third and fourth sets of regions, the orthogonal set of polarisation modifying regions is arranged to cause the direction of polarisation of said light, following its impingement thereon, to be orthogonal to the direction of polarisation of said light following its impingement on the second one of said third and fourth sets of regions, so that, in use and in conjunction with a polarising element intermediate said linear arrays and said light modulating elements, said light structuring means forms, for each of a first perspective view and a second perspective view of the scene and for said first portion of the spectral range, a set of vertically spaced concentrations of light substantially mapped respectively onto the first set and the second set of said light modulating elements, whereby the first perspective view is seen by the first eye of the observer and the second perspective view is seen by the second eye of the observer.

2. Apparatus as claimed in claim 1 in which the second one of said third and fourth sets of regions leaves the incoming polarisation of light impinging thereon substantially unaltered after impingement.

3. Apparatus as claimed in claim 2 in which the orthogonal set of polarisation modifying regions are polarisation rotating and cause the plane of polarisation of light, following impingement thereon and/or passage therethrough, to be rotated through 90°.

4. Apparatus as claimed in claim 1 in which the first axis is substantially aligned in a vertical direction and the light polarisation modifying regions of the first array are elongate, substantially in a horizontal direction, and each of said light polarisation modifying regions of the first linear array is associated with at least one corresponding vertically convergent element within a first array of the convergent elements, said first array of convergent elements being positioned intermediate the light modulating elements of the spatial light modulator and the first linear array so that light from a point at the plane of the light polarisation modifying regions of the first linear array is substantially re-imaged in a vertical plane onto the plane of the spatial light modulator by said at least one vertically convergent element.

5. Apparatus as claimed in claim 4 in which the second axis is substantially aligned in a horizontal direction and a polarisation modifying region is elongate, substantially in a vertical direction, and further comprising a corresponding horizontally convergent element within the first or a second array of the convergent elements, said horizontally convergent array being positioned intermediate the spatial light modulator and the second linear array, so that, in use, light from a point within said polarisation modifying region is substantially collimated by said horizontally convergent element in a horizontal plane.

6. Apparatus as claimed in claim 5 in which the polarisation modifying regions are tapered, the horizontally convergent elements are elongate, substantially in a vertical direction, and the horizontally convergent array is tapered to correspond with the taper of the vertically elongate polarisation modifying regions.

7. Apparatus as claimed in claim 5 which includes means for moving the second linear array relative to the horizontally convergent elements in response to the observer's location.

8. Apparatus as claimed in claim 7 in which the observer's distance from the light structuring means is tracked by relative motion between the second linear array and the horizontally convergent elements along a vertical axis.

9. Apparatus as claimed in claim 7 in which the observer's lateral position with respect to the light structuring means is tracked by relative motion of the second linear array and the horizontally convergent elements in a horizontal plane.

10. Apparatus as claimed in claim 5 in which, in use, each polarisation modifying region is comprised of a plurality of juxtaposed independently programmable elements, selected to be polarisation modifying by control means in response to the location of the observer.

11. Apparatus as claimed in claim 10 in which the observer's distance from the light structuring means is tracked by said control means, substantially by setting the period of repetition of the pattern of polarisation modifying regions.

12. Apparatus as claimed in claim 10 in which the observer's lateral position relative to the centre line of the light structuring means is tracked by said control means, substantially by positioning a nominal boundary of a polarisation modifying region at a distance corresponding thereto.

13. Apparatus as claimed in claim 12 in which an additional observer is tracked by the control means by the positioning of an additional nominal boundary of a polarisation modifying region corresponding to the position of said additional observer.

14. Apparatus as claimed in claim 10 wherein the nominal boundary of a polarisation modifying region is located, in use, within a programmable element and said element is programmed to adopt a state intermediate that of a polarisation modifying region and that of a region adjacent thereto.

15. Apparatus as claimed in claim 14 in which the intermediate state is achieved by temporal dithering, so that the proportion of time in which said element is programmed to modify the polarisation of light transmitted thereby corresponds substantially to the proportion of said element which is located intermediate the nominal boundary and an adjacent element which is programmed to be polarisation modifying.

16. Apparatus as claimed in claim 4 in which the first array of convergent elements includes a lenticular screen.

17. Apparatus as claimed in claim 5 in which the second array of convergent element includes a lenticular screen.

18. Apparatus as claimed in claim 1 in which the polarisation is linear and the second direction of polarisation is at 90° to the first direction of polarisation.

19. Apparatus as claimed in claim 1 in which the polarisation is circular, the first direction of polarisation is clockwise and the second direction of polarisation is counter-clockwise.

20. Apparatus as claimed in claim 1 in which a region within the first array of light polarisation modifying regions causes light of the first portion of the spectral range to be polarised in the first direction of polarisation and a second portion of the spectral range to be polarised in the second direction of polarisation.

21. Apparatus as claimed in claim 1 in which the vertical spacing between corresponding edges of adjacent regions within the first linear array of light polarisation modifying regions and the vertical width of said regions are related by the inequality $$Vs/2 \leq Vw \leq Vs,$$

in which Vs is the vertical spacing between the corresponding edges of said adjacent regions and Vw is the vertical width of said regions.

22. Apparatus as claimed in claim 21 comprising a reflective surface in which the elements of said first array comprise apertures and/or light transmitting regions having a vertical width.

23. Apparatus as claimed in claim 1 in which at least one of the first and second linear arrays of light polarisation modifying regions is programmable, so that, in use, regions providing light substantially polarised in the first direction of polarisation become regions which provide light polarised in the second direction of polarisation and vice versa.

24. Apparatus as claimed in claim 23, in which programming and/or switching of one of the linear arrays permits the spatial light modulator to provide a two-dimensional image to the full resolution of the spatial light modulator.

25. Apparatus as claimed in claim 1 in which the spatial light modulator includes a liquid crystal display.

26. Apparatus as claimed in claim 1 including means for providing observer position dependent perspective views.

27. A method for structuring light to provide an autostereoscopic display to an observer, said method comprising the steps of:

providing a source of light;

positioning a spatial light modulator including a first set and a second set of light modulating elements in a plane, intermediate the observer and the source of light;

providing the image content of a first perspective view of a scene for viewing by a first eye of the observer by operating the first set of light modulating elements;

providing the image content of a second perspective view of the scene for viewing by a second eye of the observer by operating the second set of light modulating elements;

positioning a light concentrating arrangement having convergent optical elements arranged in a plane intermediate the spatial light modulator and the source of light;

positioning a first linear array of light polarisation modifying regions at a first plane spaced from and intermediate the plane of the light concentrating arrangement and the source of light;

arranging a first set of the polarisation modifying regions of the first linear array to cause, for at least a first portion of the spectral range thereof, light emitted therefrom to be polarised in a first polarisation direction;

arranging a second set of the polarisation modifying regions of the first array to cause said first portion of the spectral range of the light emitted therefrom to be polarised in a second polarisation direction orthogonal to said first polarisation direction;

interleaving the first set of polarisation modifying regions with the second set of polarisation modifying regions so that odd ones of the first array comprise said first set of polarisation modifying regions and even ones of the first array comprise said second set of polarisation modifying regions and each set of polarisation modifying regions is spaced substantially along a first axis;

positioning a second linear array including an orthogonal set of light polarisation modifying regions at a second plane intermediate the plane of the spatial light modulator and the source of light and spaced from the first plane, and spacing the regions which comprise the orthogonal set of polarisation modifying regions along a second axis orthogonal to said first axis;

providing a third set of regions and a fourth set of regions within the second linear array and arranging the regions comprising the third set to be interleaved with the regions comprising the fourth set and for a first one of the third and fourth sets to comprise the orthogonal set of polarisation modifying regions;

arranging the orthogonal set of polarisation modifying regions, for light which has the same incoming direction of polarisation prior to impingement on both of said third and fourth sets of regions, to cause the direction of polarisation of said light, following its impingement thereon, to become orthogonal to the direction of polarisation of light following its impingement on the second one of said third and fourth sets of regions;

positioning a polarising element intermediate said linear arrays and the light modulating elements of the spatial light modulator and blocking therewith light polarised in one direction; and thereby forming, for each of the first perspective view and the second perspective view of the scene and for said first portion of the spectral range, a set of vertically spaced concentrations of light and substantially mapping said spaced concentrations respectively onto the first set and the second set of said light modulating elements, so that the first perspective view of the scene is seen by the first eye of the observer and the second perspective view of the scene is seen by the second eye of the observer.

28. The method of claim 27 further comprising: arranging the second one of said third and fourth sets of regions to leave the incoming polarisation of light impinging thereon substantially unaltered after impingement.

29. An apparatus for structuring light emanating from a backlight source, comprising:

a first array provided at a source plane, said first array including slit-like horizontal apertures being vertically spaced from one another;

a series of alternating polarizing elements provided substantially at the source plane and each in cooperation with respective elements of said first array, said alternating polarizing elements polarizing light passing therethrough such that adjacent ones of said alternating polarizing elements polarize light passing therethrough in alternating orthogonal directions; and a second array provided at a modifying plane, said second array including polarization rotating regions interleaved with polarization maintaining regions, the regions being vertically-elongate and horizontally juxtaposed, wherein the modifying plane is separated from the source plane.

30. The apparatus for structuring light according to claim 29, said first array being formed on a substrate having a reflective surface wherein the reflective surface faces towards the backlight source.

31. Apparatus for the display of an autostereoscopic image having at least two perspective views of a scene for viewing by an observer:

the apparatus for structuring light according to claim 29;

a spatial light modulator having an input polariser, located in use intermediate the observer and the backlight source and having a first set and a second set of light modulating elements in an image plane for providing image content for viewing respectively by a first eye of the observer and the second eye of the observer;

a first lens array of juxtaposed vertically convergent lens elements within a first lens plane wherein the convergent lens elements are spaced vertically and arranged so that the first lens plane is substantially parallel to and spaced from an image plane;

wherein light diverging vertically from a point on the source plane is imaged in a vertical plane by a vertically convergent element within said first lens array to converge onto a horizontal locus of points at the image plane and said locus coincides with a plurality of horizontally juxtaposed ones of the light modulating elements;

a second lens array of juxtaposed horizontally convergent lens elements within a second lens plane located intermediate the image plane and the source plane;

whereby, in use, the input polariser of the spatial light modulator blocks the spectral component which passes through the altering regions prior to impingement on the second set of modulating elements and permits said spectral component to be transmitted through the first set of modulating elements to reach the first eye of the observer and blocks the spectral component which passes through the maintaining regions prior to impingement on the first set of modulating elements and permits said spectral component to be transmitted through the second set of modulating elements to reach the second eye of the observer.

32. Apparatus as claimed in claim 31 in which the polarization rotating regions are tapered, the horizontally convergent lens elements are elongate, substantially in a vertical direction, and the second lens array is tapered to correspond with the taper of the vertically elongate polarization rotating regions.

33. Apparatus as claimed in claim 31 which includes means for moving the array of polarization rotating regions relative to the horizontally convergent lens elements in response to the observer's location.

34. Apparatus as claimed in claim 33 in which the observer's distance from the apparatus for structuring light is tracked by relative motion between the array of polarization rotating regions and the horizontally convergent lens elements along a vertical axis.

35. Apparatus as claimed in claim 33 in which the observer's lateral position with respect to the apparatus for structuring light is tracked by relative motion of the array of polarization rotating regions and the horizontally convergent lens elements in a horizontal plane.

36. Apparatus as claimed in claim 29 in which the polarizing elements provide linearly polarized light.

37. Apparatus as claimed in claim 29 in which the polarizing elements provide circularly polarized light.

38. Apparatus as claimed in claim 29 in which a polarizing element provides light of a first portion of the spectral range thereof to be polarized in a first direction of polarization and a second portion of the spectral range to be polarized in a second direction orthogonal to the first direction.

39. Apparatus as claimed in claim 29 in which the vertical spacing between corresponding edges of adjacent horizontal apertures within the first array and the vertical width of said apertures are related by the inequality $$Vs/2 \leq Vw \leq Vs,$$

in which Vs is the vertical spacing between the corresponding edges of said apertures and Vw is the vertical width of said apertures.

40. Apparatus as claimed in claim 29 in which, in use, each polarization rotating region is comprised of a plurality of juxtaposed independently programmable elements, selected to be polarization rotating by control means in response to the location of the observer.

41. Apparatus as claimed in claim 40 in which the observer's distance from the apparatus for structuring light is tracked by said control means, substantially by setting the period of repetition of the pattern of polarization rotating regions.

42. Apparatus as claimed in claim 41 in which the observer's lateral position relative to the centre line of the apparatus for structuring light is tracked by said control means, substantially by positioning a nominal boundary of a polarization rotating region at a distance corresponding thereto.

43. Apparatus as claimed in claim 42 in which an additional observer is tracked by the control means by the positioning of an additional nominal boundary of a polarization rotating region corresponding to the position of said additional observer.

44. A method for providing an autostereoscopic display to an observer, said method comprising:

providing an array of light modulating elements having an input polarizer;

arranging the modulating elements in horizontal rows and vertical columns in a plane in front of a backlight;

structuring light from the backlight in a vertical plane to provide different back illumination for alternate rows of the array of light modulating elements by the steps of:

locating an array of slit-like horizontally elongate apertures in a plane intermediate the array of modulating elements and the backlight;

spacing the apertures vertically;

arranging for the apertures to provide light from the backlight;

alternating for each aperture with respect to its neighboring apertures the polarization of a spectral component of the light from the apertures between two orthogonal states;

providing an array of vertically convergent optical elements at locations vertically spaced in a plane intermediate the plane of the array of apertures and the plane of the light modulating elements;

imaging light from said apertures with said vertically convergent array to form vertical concentrations of light at the plane of the light modulating elements;

arranging, by selection of the vertical spacing between the locations of the vertically convergent elements, for the vertical pitch between the vertical concentrations of light from respective ones of the apertures to be substantially equal to twice the pitch between rows of the modulating elements; and modifying the polarization of the back illumination in a horizontal plane to permit only viewing of a first set of the modulating elements by a first eye and a second set of the modulating elements by the second eye of the observer.

45. The method of claim 44 in which the polarization modifying step includes:

providing in a plane spaced from the plane of the array of apertures a first array of vertically elongate and horizontally spaced regions interleaved with a second array of horizontally spaced regions for modifying polarization;

providing an array of vertically elongate and horizontally convergent optical elements located so that each horizontally convergent element images light from a respective region in the first array of horizontally spaced regions to a first eye of the observer and images light from a respective region in the second array of horizontally spaced regions to the second eye of the observer.

* * * * *